(12) United States Patent
Zhang et al.

(10) Patent No.: US 7,940,955 B2
(45) Date of Patent: May 10, 2011

(54) VISION-BASED METHOD OF DETERMINING CARGO STATUS BY BOUNDARY DETECTION

(75) Inventors: Yan Zhang, Kokomo, IN (US); Stephen J. Kiselewich, Carmel, IN (US); Junqiang Shen, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1321 days.

(21) Appl. No.: 11/493,279

(22) Filed: Jul. 26, 2006

(65) Prior Publication Data

US 2008/0025565 A1 Jan. 31, 2008

(51) Int. Cl.
*G06K 9/00* (2006.01)
(52) U.S. Cl. .......................... 382/100; 382/103; 382/199
(58) Field of Classification Search .................. 382/181, 382/199, 100, 103
See application file for complete search history.

(56) References Cited

U.S. PATENT DOCUMENTS

| | | | | |
|---|---|---|---|---|
| 4,108,762 A | * | 8/1978 | Babunovic et al. | 209/524 |
| 4,688,244 A | * | 8/1987 | Hannon et al. | 377/58 |
| 4,813,528 A | * | 3/1989 | Hartlepp | 198/463.4 |
| 5,050,097 A | * | 9/1991 | Hasebe | 345/501 |
| 5,210,799 A | * | 5/1993 | Rao | 382/103 |
| 5,280,171 A | * | 1/1994 | Halter | 250/223 R |
| 5,493,517 A | | 2/1996 | Frazier | |
| 5,666,441 A | * | 9/1997 | Rao et al. | 382/203 |
| 5,831,937 A | * | 11/1998 | Weir et al. | 367/128 |
| 5,871,019 A | * | 2/1999 | Belohlavek | 600/450 |
| 5,877,809 A | * | 3/1999 | Omata et al. | 348/345 |
| 5,917,433 A | | 6/1999 | Keillor et al. | |
| 6,188,319 B1 | * | 2/2001 | Frucht | 340/557 |
| 6,233,060 B1 | * | 5/2001 | Shu et al. | 358/1.9 |
| 6,305,094 B1 | * | 10/2001 | Wolf | 33/562 |
| 6,437,702 B1 | * | 8/2002 | Ragland et al. | 340/686.1 |
| 6,556,775 B1 | * | 4/2003 | Shimada | 386/121 |
| 6,683,984 B1 | * | 1/2004 | Simske et al. | 382/190 |
| 6,772,089 B2 | * | 8/2004 | Ikeda et al. | 702/159 |
| 6,807,360 B1 | * | 10/2004 | Imai et al. | 386/46 |
| 6,853,751 B1 | * | 2/2005 | Milligan et al. | 382/199 |
| 6,919,803 B2 | * | 7/2005 | Breed | 340/539.14 |
| 7,227,983 B1 | * | 6/2007 | Christian et al. | 382/141 |
| 7,522,745 B2 | * | 4/2009 | Grasso et al. | 382/103 |
| 7,672,484 B2 | * | 3/2010 | Wiedemann et al. | 382/103 |
| 7,672,507 B2 | * | 3/2010 | Fan | 382/164 |
| 2002/0141658 A1 | * | 10/2002 | Novak | 382/282 |
| 2002/0177481 A1 | * | 11/2002 | Kitsutaka | 463/30 |
| 2003/0152277 A1 | * | 8/2003 | Hall et al. | 382/229 |

(Continued)

FOREIGN PATENT DOCUMENTS

JP 02071397 A * 3/1990

*Primary Examiner* — Yubin Hung
*Assistant Examiner* — Avinash Yentrapati
(74) *Attorney, Agent, or Firm* — Jimmy L. Funke

(57) ABSTRACT

The empty vs. non-empty status of a cargo container is detected based on boundary analysis of a wide-angle image obtained by a monocular vision system. The wide-angle image is warped to remove distortion created by the vision system optics, and the resulting image is edge-processed to identify the boundaries of the container floor. If package boundaries are detected within the floor space, or a large foreground package is blocking the floor boundaries, the cargo status is set to non-empty. If floor boundaries are detected and no package boundaries are detected within the floor space, the cargo status is set to empty.

11 Claims, 4 Drawing Sheets

U.S. PATENT DOCUMENTS

| | | | |
|---|---|---|---|
| 2003/0215120 A1* | 11/2003 | Uppaluri et al. | 382/128 |
| 2003/0235327 A1* | 12/2003 | Srinivasa | 382/104 |
| 2004/0095467 A1* | 5/2004 | Koizumi | 348/169 |
| 2004/0097805 A1* | 5/2004 | Verard et al. | 600/428 |
| 2004/0125217 A1* | 7/2004 | Jesson et al. | 348/231.3 |
| 2004/0140886 A1* | 7/2004 | Cleveland et al. | 340/431 |
| 2005/0074140 A1* | 4/2005 | Grasso et al. | 382/103 |
| 2005/0185172 A1* | 8/2005 | Ishimaru et al. | 356/237.2 |
| 2005/0199782 A1* | 9/2005 | Calver et al. | 250/208.1 |
| 2005/0264527 A1* | 12/2005 | Lin | 345/156 |
| 2006/0049571 A1* | 3/2006 | Buxton et al. | 271/3.17 |
| 2006/0050328 A1* | 3/2006 | Chen | 358/474 |
| 2006/0098112 A1* | 5/2006 | Kelly | 348/333.12 |
| 2006/0206243 A1* | 9/2006 | Pawlicki et al. | 701/1 |
| 2007/0019077 A1* | 1/2007 | Park | 348/211.99 |
| 2007/0122008 A1* | 5/2007 | Perlin et al. | 382/118 |
| 2007/0140821 A1* | 6/2007 | Garon et al. | 414/618 |
| 2007/0230798 A1* | 10/2007 | Naylor et al. | 382/219 |
| 2008/0025565 A1* | 1/2008 | Zhang et al. | 382/103 |
| 2008/0260254 A1* | 10/2008 | Schramm | 382/190 |
| 2008/0285856 A1* | 11/2008 | Zahavi et al. | 382/195 |
| 2009/0201192 A1* | 8/2009 | Tokoro et al. | 342/70 |

* cited by examiner

VISION-BASED METHOD OF DETERMINING CARGO STATUS BY BOUNDARY DETECTION

TECHNICAL FIELD

The present invention relates to vision-based detection of cargo stored in a container such as a semi-trailer, and more particularly to an image processing method for distinguishing between an empty container and a non-empty container.

BACKGROUND OF THE INVENTION

Various systems have been proposed for sensing the interior volume of freight cars and trailers for cargo, and for transmitting information gleaned from the sensors to a remote site such as an asset management center. See, for example, the U.S. Pat. No. 6,437,702 to Ragland et al., the U.S. Pat. No. 6,919,803 to Breed and the U.S. Patent Application Publication No. 2004/0140886 to Cleveland et al. A system disclosed in the Breed patent, for example, includes one or more imagers and a pattern recognition neural network for extracting cargo-related data for transmission to a remote location.

Although it is theoretically possible to glean detailed cargo information through the use of sophisticated processing techniques such as neural networks, it is fundamentally essential that the system be capable of reliably distinguishing between an empty container and a non-empty container. Also, it is important to minimize system cost, and to operate with low power consumption since the available electrical power may be limited to an on-board battery. Accordingly, what is needed is a cost-effective vision-based cargo sensing method that reliably and efficiently determines the empty vs. non-empty status of a cargo container.

SUMMARY OF THE INVENTION

The present invention provides an improved method of determining the empty vs. non-empty status of a cargo container based on boundary analysis of a wide-angle image obtained by a monocular vision system. The wide-angle image is warped to remove distortion created by the vision system optics, and the resulting image is edge-processed to identify the boundaries of the container floor. If package boundaries are detected within the floor space, or a large foreground package is blocking the floor boundaries, the cargo status is set to non-empty. If floor boundaries are detected and no package boundaries are detected within the floor space, the cargo status is set to empty.

DESCRIPTION OF THE PREFERRED EMBODIMENT

Figure 1A:
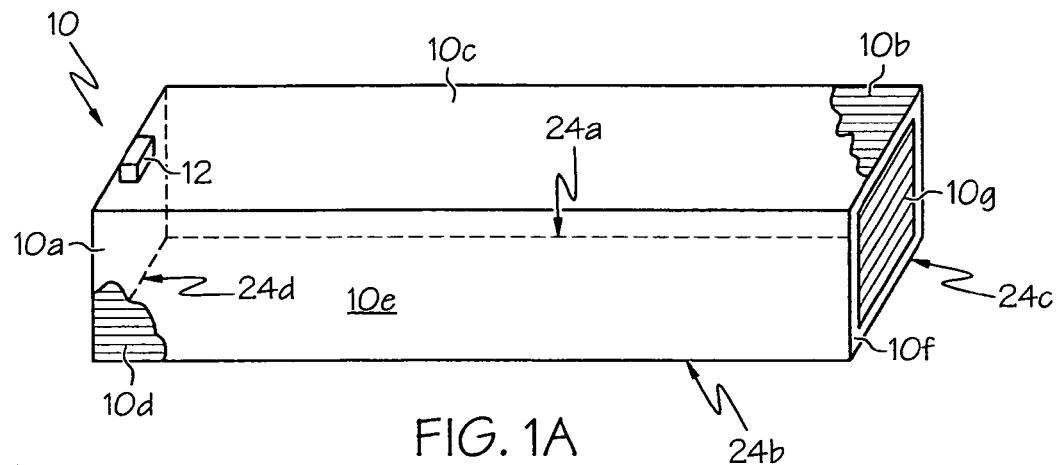
FIG. 1A is a diagram of a semi-trailer equipped with a monocular vision system for carrying out the method of the present invention.

Referring to FIG. 1A, the reference numeral 10 generally designates a cargo container such as a semi-trailer equipped with a monocular vision module 12. In the illustrated embodiment, the vision module 12 is mounted on the front wall 10a of container 10, near the ceiling 10b, and midway between the sidewalls 10c, 10d. Alternately, the vision module 12 may be located on the rear wall 10f above the rear access door 10g. In any event, vision module 12 includes vision system components for producing a digital image that encompasses the entire floor 10e and at least a portion of the rear wall 10f, and for processing the image to determine the cargo status (i.e., empty vs. non-empty).

Figure 1B:
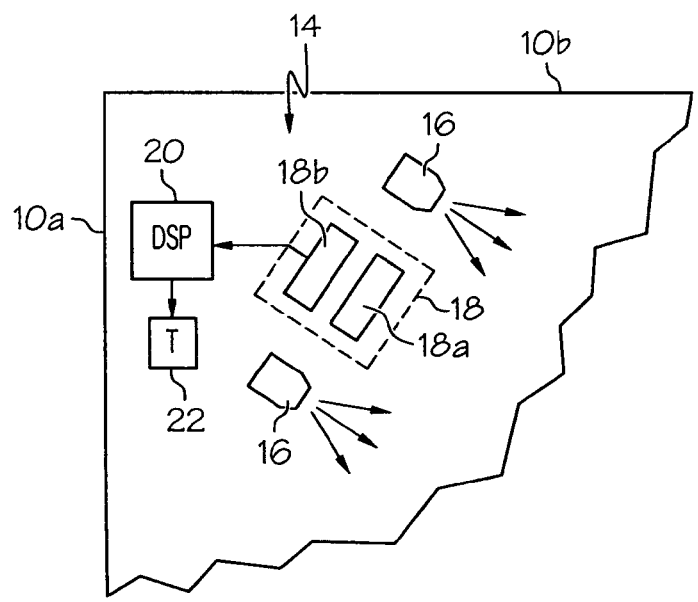
FIG. 1B is a block diagram of the vision system of FIG. 1A, including an imager and a digital signal processor (DSP) for carrying out the method of this invention.

Referring to FIG. 1B, the reference numeral 14 generally designates a monocular vision system housed within the vision module 12 of FIG. 1A. The vision system 14 includes a set of active light sources 16 (such as light-emitting-diodes that emit near-infrared light) for illuminating the interior volume of container 10, a digital camera 18, a digital signal processor (DSP) 20, and a radio-frequency transceiver 22. The camera 18 includes a wide-angle lens 18a and a solid-state imaging chip 18b. The focal length of lens 18a is selected to provide a sufficiently wide field-of-view to encompass at least the entire floor 10e of container 10, and imaging chip 18b creates a corresponding digital image. Other optical parameters of lens 18a are selected to provide suitable image brightness and sharpness, given the expected range of illumination. The DSP 20 processes images produced by imaging chip 18b to determine the cargo status (i.e., empty vs. non-empty) of container 10, and transceiver 22 transmits the cargo status to a remote location such as an asset management center.

According to the invention, DSP 20 attempts to identify a first boundary 24a between the floor 10e and side wall 10c, a second boundary 24b between the floor 10e and side wall 10, and a third boundary 24c between the floor 10e and rear wall 10f. These boundaries can be distinguished from other boundaries by their location with respect to the vision module 12 and their apparent length when not blocked by cargo packages. If package boundaries are detected within the floor space, or a large foreground package is blocking the floor boundaries, the cargo status is set to non-empty. If floor boundaries are detected and no package boundaries are detected within the floor space, the cargo status is set to empty. In a preferred implementation, boundary identification is simplified by initially warping the wide-angle image to remove distortion created by the camera lens 18a; in this case, the boundaries 24a-24c as well as the package boundaries are detected as simple line segments.

Figure 2A:
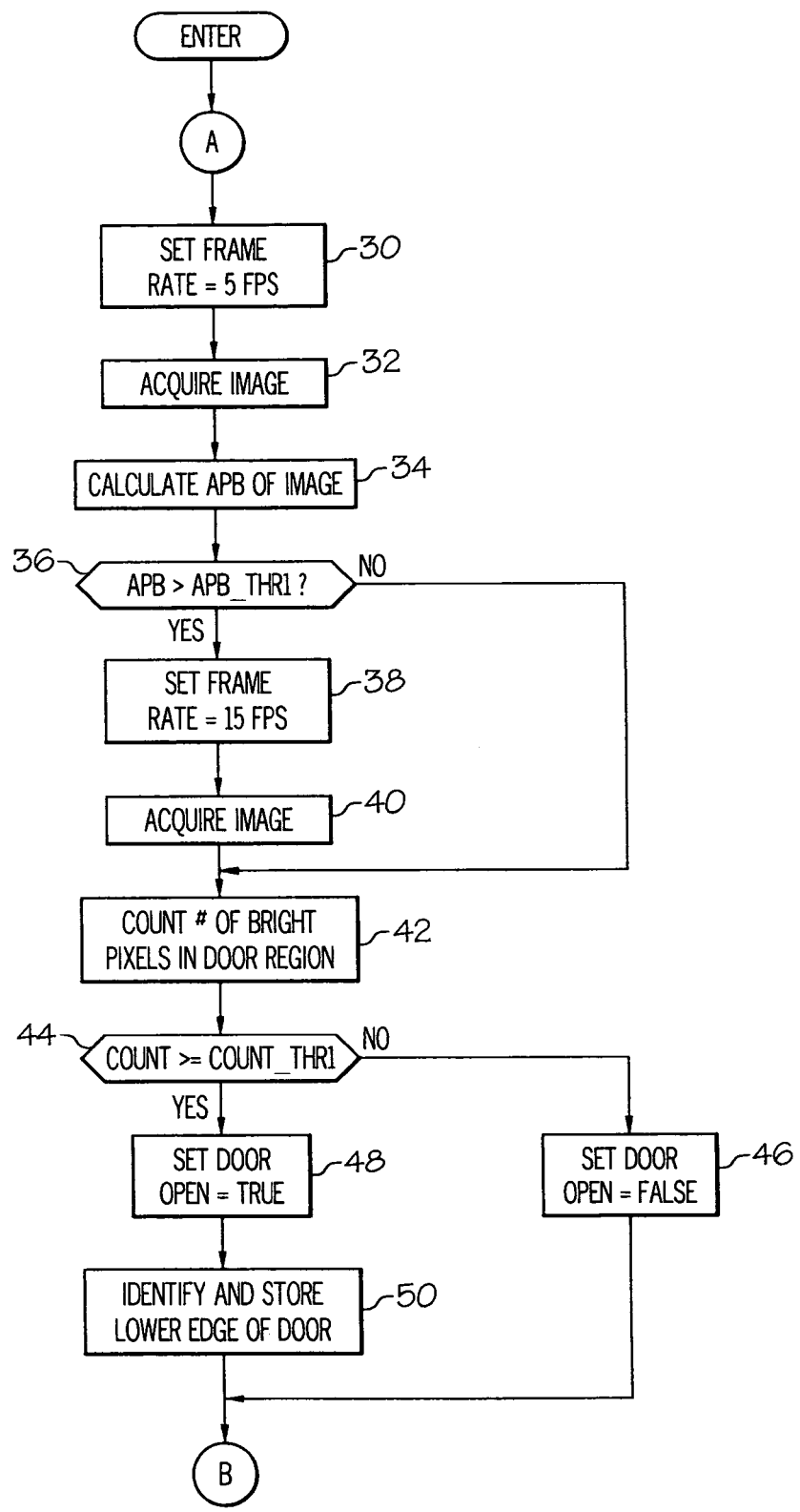
FIGS. 2A, 2B and 2C together depict a flow diagram representative of a software routine periodically executed by the DSP of FIG. 1B for carrying out the method of the present invention.
Figure 2B:
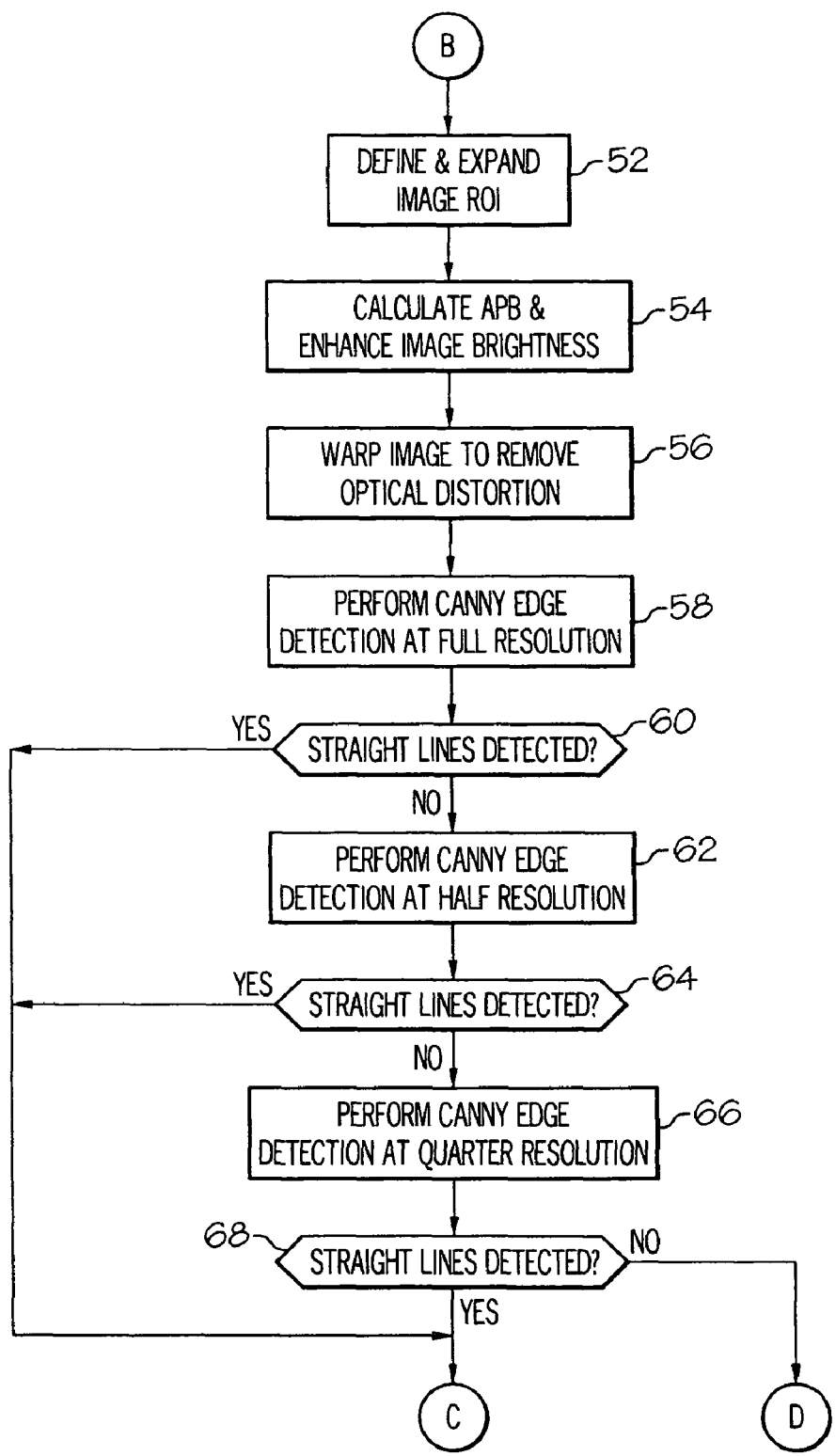
Figure 2C:
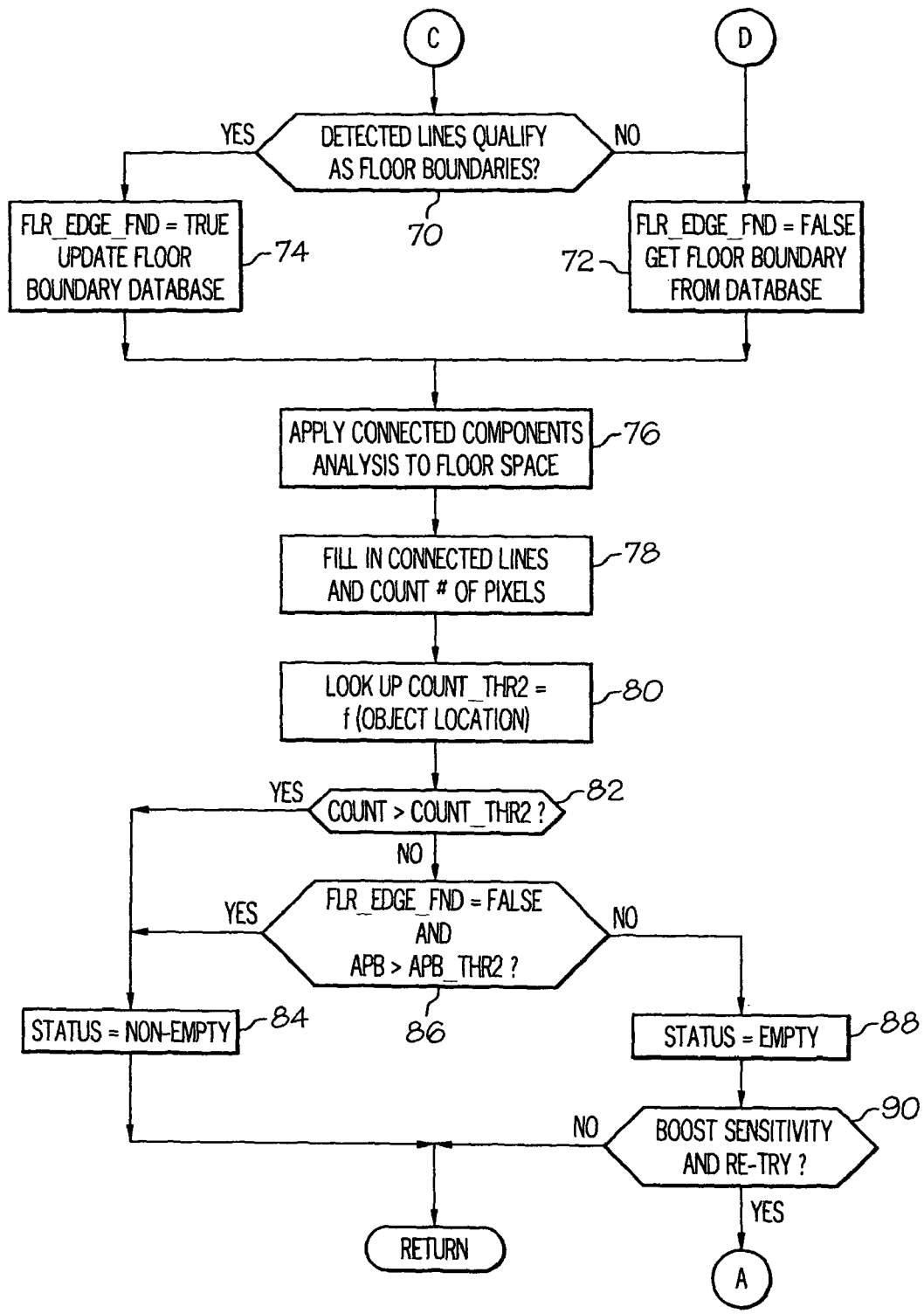

The flow diagram of FIGS. 2A, 2B and 2C represents a software routine resident within DSP 20 and periodically executed by DSP 20 for carrying out the above-described method. For example, the routine may be executed at a specified periodic rate, in response to a specified event, or in response to a communication from a remote location such as an asset management center.

The blocks 30-40 of FIG. 2A are initially executed to acquire an image from imaging chip 18b. Blocks 30 and 32 set the imager frame rate to the default setting of five frames-per-second (5 FPS) to acquire a long-exposure image. Alternatively, or in addition, other camera parameters such as integration time and gain can be selected to achieve a similar effect. Blocks 34 and 36 calculate the average pixel brightness (APB) of the acquired image and compare it to a first threshold value (APB_THR1). If APB>APB_THR1, the image is over-exposed, and blocks 38 and 40 are executed to set the imager frame rate to a higher value such as fifteen frames-per-second (15 FPS) and to acquire a lower exposure image.

Once a suitably exposed image is acquired, block 42 counts the number of bright pixels (i.e., pixels having a brightness value in excess of a threshold) in a defined region of the image corresponding to the area occupied by rear access door 10g, which can be easily determined once the vision module 12 is installed. Block 44 compares the bright pixel count to a first count threshold (CT_THR1) to determine the door state. If the bright pixel count is less than CT_THR1, the door 10g is deemed to be closed, and block 46 sets a Door Open flag to False. Otherwise, the door 10g is deemed to be open and block 48 sets the Door Open flag to True. When an open door is detected, block 50 additionally identifies the lower edge boundary of door 10g for purposes of defining the rear floor boundary 24c of the container 10. The identified rear boundary is stored for use in later executions of the routine since the rear floor boundary 24c is typically difficult to detect when the door 10g is closed.

In the portion of the flow diagram depicted in FIG. 2B, blocks 52-56 limit, enhance and linearize the acquired image, and blocks 58-68 then perform a multi-resolution Canny-Edge detection process to identify edge boundaries in the image. For a detailed description of Canny edge detection, see the publication entitled "A Computational Approach to Edge Detection" by John Canny, IEEE Transactions on Pattern Analysis and Machine Intelligence, Vol. 8, No. 6, 1986, incorporated herein by reference. The detected edge boundaries are then used in the portion of the flow diagram depicted in FIG. 2C to identify floor and package boundaries.

The block 52 limits the image to a region-of-interest (ROI) by discarding the portion of the image above the container's rear boundary (if previously detected at block 50) and linearly expands the ROI to the original area of the image to enhance the Canny-Edge detection. Block 54 then calculates the average pixel brightness (APB) of the expanded ROI and expands the pixel brightness range. Different techniques can be used to expand the brightness range, and the technique is selected based on the calculated APB. If the APB is low, an adaptive contrast enhancement technique including a logarithmic transform is used. If the APB is medium, an Affine stretch technique is used. And if the APB is high, a simple linear stretch is used. Finally, block 56 warps the enhanced image to remove optical distortion created by the wide-angle camera lens 18a; this allows the floor boundaries 24a and 24b and any package boundaries to be detected as linear segments instead of curves.

The Canny-Edge detection of blocks 58-68 can be performed at different resolutions for optimal edge detection. This is important because the image may be somewhat cluttered even when the container 10 is empty due to color variations or patches in the floor and sidewalls, and lower resolution processing produces better floor and package boundary detection in an otherwise cluttered image. The block 58 first performs Canny-Edge detection at the full image resolution, such as 640-by-480 for example. Block 60 evaluates the result, and determines if the edge detection produced straight lines that could conceivably represent floor or package boundaries. If block 60 is answered in the affirmative, the routine proceeds to block 70 of FIG. 2C; otherwise, the block 62 is executed to perform Canny-Edge detection at one-half image resolution, such as 320-by-240, for example. If the detection results satisfy the constraints of block 64, the routine proceeds to block 70 of FIG. 2C; otherwise, the block 66 is executed to perform Canny-Edge detection at one-quarter image resolution, such as 160-by-120, for example. If the detection results fail to satisfy the constraints of block 68, block 72 of FIG. 2C is executed to set the FLR_EDGE_FND flag to False (indicating that a floor boundary was not found), and to fetch previously determined floor boundary information from a data archive resident within DSP 20. In some applications, it may be desired to reverse the illustrated high-to-low multi-resolution process by performing the one-quarter resolution edge processing first and the full resolution edge processing last.

If the multi-resolution Canny-Edge detection process produces straight lines that could conceivably represent floor or package boundaries, the block 70 of FIG. 2C determines if any of the lines qualify as floor boundaries 24a or 24b. This may be determined by the length and offset distance of the line from imager 18, and its orientation or angle in the image. If these constraints are not satisfied for any of the detected lines, block 72 is executed as described above to set the FLR_EDGE_FND flag to False and to fetch previously determined floor boundary information from the data archive. If the constraints of block 70 are satisfied, the block 74 is executed to set the FLR_EDGE_FND flag to True (indicating that a floor boundary was found), and to adaptively update the floor boundary information in the data archive. This maintains the archived floor boundary data reasonably accurate over time, and compensates for changes that occur if the imager's field-of-view is adjusted for any reason.

Once the floor boundaries 24a and 24b are acquired (either from the Canny-Edge detection or the data archive), the blocks 76-82 evaluate the portion of the image between the floor boundaries 24a and 24b (i.e., the floor space 10e of container 10) to determine if any cargo packages are present. Block 76 performs a connected-components analysis in which similarly oriented line segments are fused or joined for complete edge analysis. Block 78 then fills in gaps (if any) in the connected line segments to form representations of cargo packages, and counts the number of pixels in any given line segment as a measure of the package size. Blocks 80 and 82 then determine a count threshold COUNT_THR2 and compare it with the pixel count from block 78. The count threshold COUNT_THR2 is preferably determined by table look-up as a function of the distance of the line segment from the imager 18 to account for the fact that the image size of a package decreases as its distance from imager 18 increases. If the pixel count is greater than or equal to COUNT_THR2, a cargo package is detected, and block 84 is executed to set the cargo status to NON-EMPTY. If the pixel count is less than COUNT_THR2, block 86 is executed to determine if the imager's field-of-view is blocked by a large foreground package. Specifically, if the FLR_EDGE_FND flag is False (i.e., no floor edges detected by Canny-Edge detection) and the average pixel brightness (APB) of the image exceeds a threshold APB_THR2 (i.e., the light produced by light sources 16 is being reflected back to imager 18 with low attenuation), a large foreground package is detected, and block 84 is executed to set the cargo status to NON-EMPTY. If both blocks 82 and 86 are answered in the negative, no cargo packages are detected; in this case, block 88 is executed to set the cargo status to EMPTY and block 90 determines if the routine should be re-executed with different parameters to boost the image exposure. For example, the routine can be re-executed if the door 10g is determined to be closed (i.e., DOOR OPEN=False) or the number of low-brightness pixels exceeds a threshold. The image exposure can be boosted in various ways, such as by increasing the integration time of imaging chip 18b, reducing the frame rate, reducing the f-number of the lens 18a, and increasing the illumination provided by the active light sources 16. If block 90 is answered in the negative, the routine is exited.

In summary, the method of the present invention reliably and efficiently determines the empty vs. non-empty status of a cargo container with a simple wide-angle monocular imager. While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of determining a cargo status of a container having a floor, sidewalls, and a rear wall supporting a door that can be open or closed, comprising the steps of:
  producing a digital image encompassing said floor and boundaries between said floor and said sidewalls, and at least a portion of said door;
  edge-processing said image, and identifying a floor portion of said image bounded by detected edges that correspond to the boundaries between said floor and said sidewalls;
  evaluating pixel brightness in a portion of said image corresponding to said door to determine whether said door is open;
  locating a lower edge of said door when it is determined that said door is open;
  bounding said floor portion of said image by the located lower edge of said door;
  evaluating the detected edges within the identified floor portion of said image to detect edges of cargo; and
  determining the cargo status of said container based on said evaluation.

2. The method of claim 1, including the steps of:
  producing the digital image with a wide-angle lens; and
  warping the produced image to remove optical distortion caused by the wide-angle lens so that the edges that correspond to the boundaries between said floor and said sidewalls are detected by said edge-processing as linear segments.

3. The method of claim 2, including the steps of:
  edge-processing said image at a first resolution and determining if a linear segment was detected; and
  edge-processing said image at a second resolution lower than said first resolution if said linear segment was not detected.

4. The method of claim 2, including the step of:
  determining if a linear segment detected by said edge-processing corresponds to a boundary between said floor and a sidewall based on a length of said segment and its location and orientation in said image.

5. The method of claim 1, including the steps of:
  adaptively updating floor boundary information stored a data archive based on said detected edges that correspond to the boundaries between said floor and said sidewalls; and
  subsequently identifying the floor portion of said image based on the adaptively updated floor boundary data stored in said data archive when the edges that correspond to the boundaries between said floor and said sidewalls are not detected by said edge-processing.

6. The method of claim 1, including the steps of:
  storing door edge data pertaining to the located lower edge of said door in a data archive; and
  subsequently bounding said floor portion of said image based on the door edge data stored in said data archive when it is determined that said door is closed.

7. The method of claim 1, where the step of evaluating the detected edges within the identified floor portion includes the steps of:
  measuring a length of a detected edge; and
  determining that the detected edge is a cargo edge if the measured length exceeds a threshold length.

8. The method of claim 7, where said digital image is produced by a imaging device mounted at one end of said container, and said threshold length decreases with increasing distance of said detected edge from said imaging device.

9. The method of claim 7, including the step of:
  setting said cargo-status to non-empty when said detected edge is determined to be a cargo edge.

10. The method of claim 7, including the step of:
  setting said cargo-status to empty when none of the detected edges are determined to be cargo edges.

11. The method of claim 1, including the step of:
  detecting a large item of cargo in a foreground of said digital image when an average brightness of said digital image exceeds a threshold and the boundaries between said floor and said sidewalls are not detected by said edge-processing; and
  setting said cargo status to non-empty if said large item of cargo is detected.

* * * * *